Patented June 29, 1954

2,682,537

UNITED STATES PATENT OFFICE 2,682,537

DIPHENYL ETHANOLAMINE SALT OF PENICILLIN

William B. Wheatley, Syracuse, and Joseph T. Alberi, Jamesville, N. Y., assignors to Bristol Laboratories Inc., Syracuse, N. Y., a corporation of New York No Drawing. Application February 16, 1951, Serial No. 211,438

2 Claims. (Cl. 260—239.1)

The present invention relates to new amine salts of penicillin.

It will be understood that two asymmetric carbon atoms exist. However, the invention is not limited to any particular isomers, but includes all possible isomers.

The amine salts of penicillin of this invention are capable of exerting prolonged repository antibiotic action.

A more comprehensive understanding of this invention is obtained by reference to the following example.

EXAMPLE

α,β-Diphenyl-β-hydroxyethylamine salt of penicillin

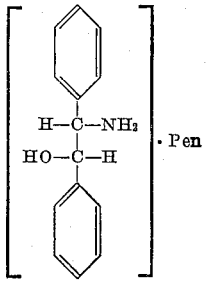

To .48 g. of α,β-diphenyl-β-hydroxyethylamine hydrochloride dissolved in 6 ml. of distilled water was added a solution containing 1 g. of sodium penicillin G in 4 ml. of water. The solution was stirred well and an oil precipitated. On scratching and stirring crystals formed. After standing for half an hour in an ice bath the crystals were filtered off and dried in a vacuum desiccator.

Assay showed a potency of 1207 u./mg. and a water solubility of 6630 u./ml.

We claim:

1. A salt of penicillin G and α,β-diphenyl-β-hydroxyethylamine.

2. A salt of penicillin and α,β-diphenyl-β-hydroxyethylamine.

References Cited in the file of this patent

UNITED STATES PATENTS

| Number | Name | Date |
|---|---|---|
| 2,493,625 | Goldberg et al. | Jan. 3, 1950 |
| 2,527,810 | Goldberg et al. | Oct. 31, 1950 |